United States Patent [19]

Barker et al.

[11] 4,282,468
[45] Aug. 4, 1981

[54] HIGH SPEED POSITION FEEDBACK AND COMPARATOR SYSTEM

[75] Inventors: Thomas Barker, South Holland; Andrew L. Russel, Jr., Bridgeview; Gary Bricault, Oak Lawn, all of Ill.; Albert L. Van Wieren, Griffith, Ind.

[73] Assignee: Hyper-Loop, Inc., Bridgeview, Ill.

[21] Appl. No.: 30,079

[22] Filed: Apr. 16, 1979

[51] Int. Cl.³ .............................................. G05B 1/01
[52] U.S. Cl. .................................... 318/608; 318/603; 318/661
[58] Field of Search .............. 318/605, 571, 603, 608, 318/661

[56] References Cited

U.S. PATENT DOCUMENTS

| | | | |
|---|---|---|---|
| 3,079,522 | 2/1963 | McGarret | 318/162 |
| 3,490,017 | 1/1970 | Kolell | 340/347 |
| 3,539,895 | 11/1970 | McGee | 318/570 |
| 3,562,619 | 2/1971 | Hyoguchi et al. | 318/605 X |
| 3,614,575 | 10/1971 | Cutler | 318/571 X |
| 3,670,324 | 6/1972 | Trevor | 340/347 AD |
| 3,786,333 | 1/1974 | Sommeria | 318/604 |
| 4,021,714 | 5/1977 | Jones | 318/605 |
| 4,164,693 | 8/1979 | Leenhouts | 318/571 X |

FOREIGN PATENT DOCUMENTS

1171690 11/1969 United Kingdom ..................... 318/571

*Primary Examiner*—B. Dobeck
*Attorney, Agent, or Firm*—Neuman, Williams, Anderson & Olson

[57] ABSTRACT

A positioning system is provided in which command and feedback signals are processed to develop an analog error signal for application to a servo drive to position a controlled element. The command signals are in the form of pulses each of which corresponds to a certain incremental distance of movement. The feedback signals are developed from phase shifts of a low frequency resolver signal, such phase shifts being proportional to movement of the element. Such feedback signals are applied to a resolver digitizer circuit which develops a train of resolver pulses in response to the phase shift represented by each feedback signal. Each such resolver pulse corresponds to the same incremental distance of movement as a command pulse and both the resolver pulses and the command pulses are applied to a comparator and error signal circuit in which any cumulative error in either direction is stored as a digital number and is converted to an analog error signal of the proper polarity. The system effects accurate positioning of an element while accommodating a large temporary following error and thereby allowing movement at high speeds in response to high command pulse frequencies.

20 Claims, 6 Drawing Figures

HIGH SPEED POSITION FEEDBACK AND COMPARATOR SYSTEM

This invention relates to a high speed position comparator and feedback system and more particularly to a system usable with servo systems or the like to allow application of command pulses at a very high frequency without imposing excessive response and gain requirements on servo components and amplifiers. The system is accurate and reliable in operation and is usable with standard types of resolvers and other components.

BACKGROUND OF THE INVENTION

A great many digital position control systems have heretofore been provided for moving an element along or about one or more axes in response to input numerical information. Typically, program information is supplied on punched or magnetic tape which is read to produce command pulses at rates corresponding to the desired speed of movement with each pulse corresponding to a certain increment of movement. One application is in machine tool control and an early disclosure relating thereto is contained in the McGarrell U.S. Pat. No. 3,079,522 issued Feb. 26, 1963. As described therein, each command pulse might correspond to a movement of one ten-thousandths of an inch and the command pulses may be applied at a rate such as to produce a maximum speed of one inch in five seconds or 0.2 inches per second, the frequency of the command pulses then being 2000 Hz.

In the McGarrell system, the command pulses are applied between and thereby added to pulses of a high frequency clock signal, or are used to delete pulses of the clock signal, the clock signal with the added or deleted pulses being applied through count-down circuits to produce a 200 Hz phase-modulated command signal which is applied to a phase detector along with a 200 Hz feedback signal from a resolver. The phase detector develops an analog error signal which is applied to a servo system to drive the resolver and a controlled element until a phase balance is obtained between the 200 Hz feedback and phase-modulated command signals.

Systems which are similar to that of the McGarrell patent are disclosed in British Pat. No. 1,171,690, the Kolell, et al. U.S. Pat. No. 3,490,017 issued Jan. 13, 1970, the McGee U.S. Pat. No. 3,539,895 issued Nov. 10, 1970 and the Sommeria U.S. Pat. No. 3,786,333 issued Jan. 15, 1974. In the system of the British, Kolell, et al. and McGee patents, the resolver is supplied with a 500 Hz signal and a feedback signal at that frequency therefrom is shaped into a square wave and compared with a square wave phase-modulated command signal at the same frequency to produce a signal which is passed through a low pass filter or integrator to produce an error signal. In the Sommeria system, the resolver is supplied with a 3000 Hz signal and a feedback signal at that frequency therefrom is shaped into a square wave and it and a square wave phase-modulated command signal are applied through count-down circuits both having a radix of eight to produce 375 Hz signals which are compared to produce an error signal for application to a servo drive.

Such systems and other similar systems using resolvers have been used very extensively in a wide variety of applications. Another prior type of system uses a shaft position encoder which is mechanically coupled to an element to generate pulses in response to movement of the element, each pulse corresponding to an incremental distance of movement. With encoders which use optical or other special techniques, it is possible to reduce the incremental distance which corresponds to one pulse to a very small value and thus obtain a high degree of accuracy. However, such encoders present many mechanical and other problems which preclude their use in many applications and especially where there is a requirement for a rugged system which will reliably operate at high speeds.

With regard to the performance capabilities of prior systems, the maximum frequency of command pulses which can be accepted by commercial systems has been on the order of 100 KHz, possibly up to 125 KHz in some systems, it being noted that the maximum usable command pulse frequency is a useful criterion for evaluation. Specifications as to operational speeds or obtainable accuracies are not always meaningful since by judicious selection of gear ratios or other parameters, it is generally possible to make improvements with respect to speed at the expense of accuracy or vice versa.

One recognized problem in attempting to increase the usable command pulse frequency for increased operational speed and/or accuracy is that the response characteristics and gains of servo motors and servo amplifiers have been limited. Improvements of such components have been made but there appear to be practical limits on making further improvements without going to undue expense or making sacrifices with respect to reliability, size, power requirements or other factors.

SUMMARY OF THE INVENTION

This invention was evolved with the general object of providing a digital control system having increased capabilities with respect to speed and accuracy while also being rugged, reliable and economically manufacturable.

The invention is based in part upon analyses of prior systems and upon the discovery and recognition of features which create problems in limiting performance thereof.

It has been found that one of the problems with feedback and signal processing positions of prior systems relates to their capabilities with respect to the allowable following error between the instantaneous position of a controlled element and the position commanded by applied command pulses. Such a following error is necessarily produced in the operation of any servo system. Its magnitude, which tends to increase as drive forces and velocities increase, may be reduced by improvements of the response characteristics and gains of servo motors and amplifiers. However, as aforementioned, there are practical limits on making such improvements.

In prior systems, the allowable following error may be increased by changing operational parameters but not without encountering other problems. An example relates to the aforementioned systems in which an error voltage is produced by integration of the differences between a phase modulated square wave command signal and a square wave signal derived from a resolver. In such systems, the allowable following error is limited to the distance which corresponds to a 180 degree shift in the signal derived from the resolver. It can be increased, as by using added divider stages in producing the square wave signals, but in doing so the frequency of such signals is reduced, the sampling rate is slowed down and the output error voltage will contain abrupt changes of large magnitude so that the drive of the element will be rough and erratic. Also since any measured increment in phase difference represents a greater incremental change in distance, any errors are proportionally magnified and the positional accuracy is proportionately reduced. Thus, the accurate positional information which is available from the resolver is not fully utilized.

In a system constructed in accordance with this invention, feedback signals such as derived from a resolver in the aforementioned prior systems are not compared with phase modulated command signals. Instead, a circuit is provided which is referred to herein as a resolver digitizer circuit and in which the feedback signals are used to generate sequential trains of pulses with the number of pulses in each train corresponding to the change in distance represented by the corresponding feedback signal. With this arrangement a high degree of positional accuracy can be obtained and in accordance with a specific feature, the resolver digitizer circuit includes gating means for transmitting a number of clock pulses in accordance with the distance change. By using a high clock frequency, each pulse may correspond to a small incremental distance.

Certain advantageous features relate to the comparison of trains of feedback pulses generated by the resolver digitizer circuit with command pulses to generate an analog error signal for application to a servo drive system. Both the feedback pulses and the command pulses are fed to counter means in a manner such that an error signal is developed and temporarily stored in digital form. The digital error signal so developed is applied to a converter to develop the analog error signal for application to the servo drive system. With the error signal being stored in digital form, it is possible to store a large following error, whatever is necessary to accommodate the limitations of a servo drive system. At the same time the analog error signal can be accurately developed and the system can fully utilize the advantages of the very high degree of accuracy obtained from the sequential generation of trains of feedback pulses from the feedback signals.

Through a combination of such features, a substantial increase in performance capabilities can be realized. For example, a system has been provided which will accept command pulses at a frequency of 1 Mega Hertz and which will move an element at speeds of up to 10 inches per second with a positional accuracy of 10 millionths of an inch per command pulse. Moreover, systems using the invention can be readily designed to accept higher frequencies, the principal limitation on frequency being the response times of digital circuit components.

In accordance with additional important features, the feedback signal means comprises resolver means which will develop the feedback signals with each feedback signal being shifted in phase in proportion to movement of an element since the next previous feedback signal. For example, a square wave signal may be developed from a sinusoidal output signal from a conventional resolver and the feedback signals may be formed by the positive-going and/or negative-going edges of the square wave signal. To develop trains of pulses, the phase of a reference signal is compared with that of the feedback signals and signals are generated to control gating of clock pulses. With a reference signal in the form of a square wave, it may be applied to a gate circuit along with the square wave signal developed from the resolver output to develop pulses having widths or durations proportional to phase shift.

Another important feature relates to the use of a rate multiplier circuit in generating the trains of feedback pulses at a substantially uniform rate to minimize abrupt changes in the analog error signal and to obtain very smooth operation of the servo system.

A further advantageous feature relates to the feedback of the sequential trains of feedback pulses in a manner such as to shift the phase of a reference signal used for measurement of the phase shift of the signal derived from resolver means. The phase of the reference signal is continually up-dated so that each measured phase shift is that occurring since the last measured phase shift. Preferably, a correction counter is used in a manner such that a balance can be obtained to terminate generation of feedback pulses only when the cumulative number of output pulses which are fed back to the correction counter cause the cumulative reference signal phase shift to equal the cumulative phase shift of the resolver output. As a result, a very high degree of positional accuracy is achieved.

Still another feature relates to the provision of what may be described as an automatic zero circuit which is operative to insure that the reference signal will be in proper phase relation to the resolver signal under certain reference conditions; such as at initial turn on. Preferably, the reference signal is generated by comparison of signals in a reference counter and a correction counter as aforementioned and a circuit is provided for establishing the same count in both counters at the time of zero crossing of the resolver output so as to produce a phase shift of the reference signal equal to the phase shift of the resolver output.

Additional features relate to circuitry for applying the feedback and command pulses to counter means and to the operation of such counter means in a manner such as to store a digital signal which accurately corresponds to any accumulated error and which is applied through a digital-to-analog converter to develop an analog error signal. A reversible counter is provided together with a sign memory circuit for controlling pulse steering or direction control circuitry to control the effective direction of application of pulses so as to permit the counter to accumulate an error in either an "up" or a "down" direction. The sign memory may also control the polarity of the output analog signal. A latch and multiplexing arrangement is provided for asynchronous input pulse operation, allowing processing of feedback and command pulses which are not generated in fixed timed relation to a common clock or time base, so as to allow processing of pulses arriving in coincident or overlapping relation.

This invention contemplates other object features and advantages which will become more fully apparent from the following detailed description taken in conjunction with the accompanying drawings.

DESCRIPTION OF A PREFERRED EMBODIMENT

Figures 1, 2:
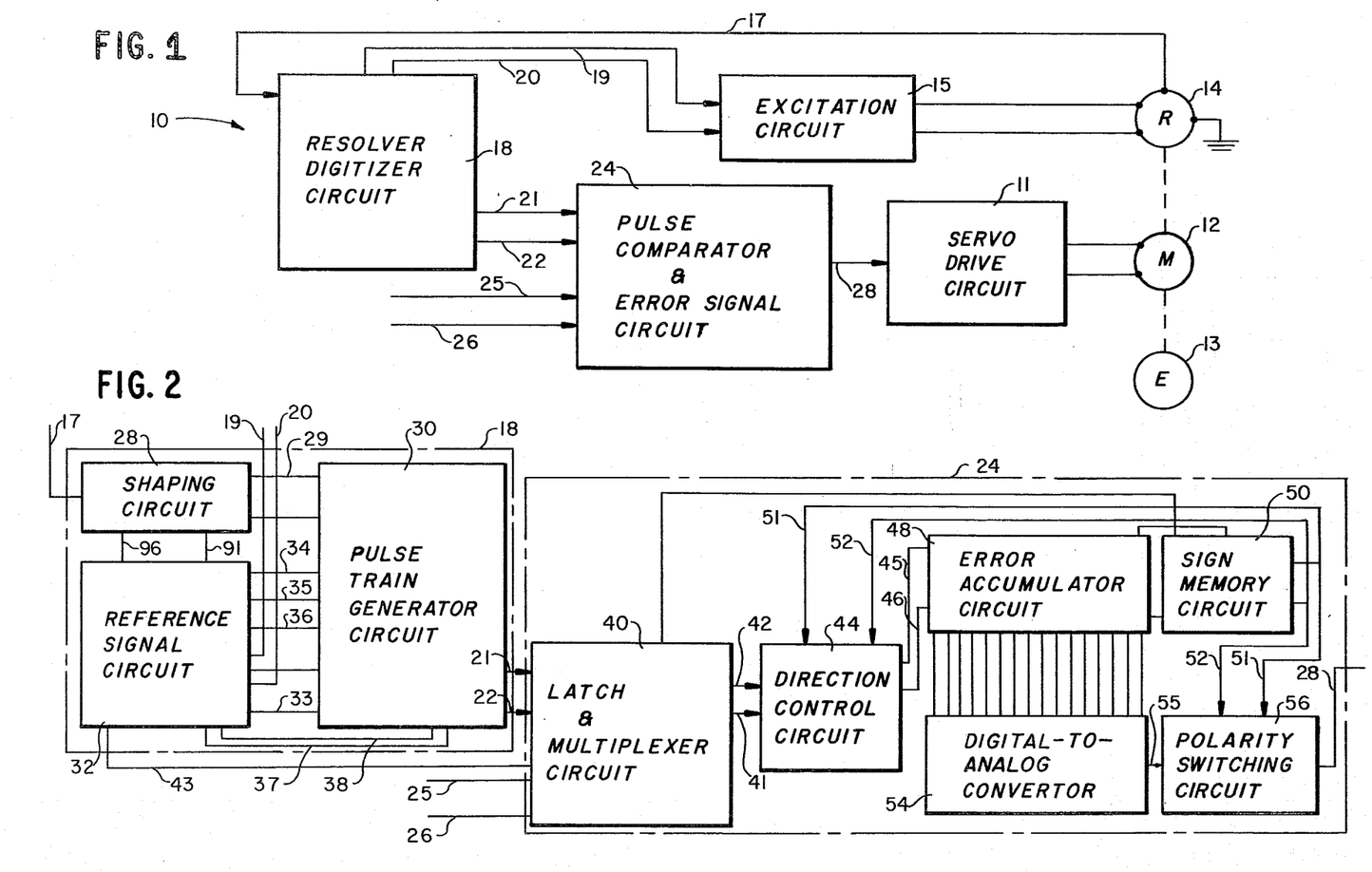
FIG. 1 is a block diagram of a digital control system according to the invention, shown connected to a servo drive circuit and motor.
FIG. 2 is a block diagram showing basic portions of a resolver digitizer circuit of the system of FIG. 1 and also basic portions of a pulse comparator and error signal circuit of the system of FIG. 1.

Reference numeral 10 generally designates a positioning system constructed in accordance with the principles of this invention and designed for effecting a programmed movement along or about one axis in response to input numerical information in the form of "up" and "down" command pulses. It may be used in machine tool control and in a variety of other applications. Typically, a plurality of systems as illustrated may be used for effecting movements along or about a plurality of axes.

The system 10 is particularly designed to be capable of accepting command pulses at a high frequency to effect movements at both a high speed and with a high degree of accuracy. By way of example, the system may be designed to accept command pulses at a frequency of up to 1 MHz and to obtain a speed of movement of up to 10 inches per second with ten millionths of an inch of movement being produced by each command pulse.

The system 10 is also designed to be usable with conventional servo drive and feedback signal generating components. As diagrammatically illustrated, a servo drive circuit 11 energizes a DC motor 12 which is mechanically coupled to an element 13 and may, for example, drive a screw to effect linear movement of element 13. Feedback signals are developed by a resolver 14 to which AC "sine" and "cosine" signals in quadrature phase relation are applied from an excitation circuit 15. The resolver 14 develops on an output line 17 thereof, a complex AC signal at a relatively low frequency which is shifted in phase in proportion to linear movement of the element 13.

By way of example, the element 13 may be driven through a 2 pitch screw to be moved 0.5 inches for each revolution of the shaft of motor 12. The resolver 14 may be geared up from the shaft of motor 12 by a factor of 2.5 and may be a ten pole resolver, developing 5 nulls (phase alignments with an applied reference) during each revolution thereof, 12.5 nulls for each revolution of the shaft of motor 12 and 25 nulls for each inch of linear movement of the element 13. To obtain a drive speed of 10 inches per second, the motor 12 is rotated at 1200 RPM and with a 2.5 gear up, the resolver 14 is rotated at 3000 RPM. Such rotational speeds can be readily realized in practice with conventional components. The resolver 14 input and output signals may be at a frequency of 2500 Hz which is also within practical design limits.

As aforementioned, in certain prior types of systems an AC signal such as developed on resolver output line 17 is applied through shaping and/or divider circuits to develop a low frequency square wave signal and an error signal is developed by comparing the phase thereof with that of another square wave signal developed through a divider or count-down circuit from clock and command pulses. In the system 10, however, the resolver output signal on line 17 is processed by a resolver digitizer circuit 18 to develop high frequency pulses and an error signal for application to the servo drive 11 is developed from comparison of such high frequency pulses with applied command pulses.

The resolver digitizer circuit 18 includes a clock circuit from which low frequency reference square wave signals are developed and applied through lines 19 and 20 to the resolver excitation circuit 15. In addition, the resolver digitizer circuit 18 develops high frequency up and down resolver pulses which are applied through lines 21 and 22 to a comparator and error signal circuit 24 along with up and down command pulses on lines 25 and 26. Circuit 24 develops an analog error signal which is applied through a line 28 to the servo drive circuit 11.

The up and down resolver pulses developed on lines 21 and 22 are in sequential pulse trains and the number of pulses in each train is proportional to the distance of movement represented by a feedback signal developed from the resolver output signal on line 17. Preferably, each such resolver pulse corresponds to the same increment of movement as that to which a command pulse corresponds. As a result, there can be a direct comparison between the numbers of applied command and resolver feedback pulses in the comparator circuit 24 to develop an error signal.

In the circuit 24, any cumulative error is stored in digital form and is used to develop a proportional error signal in analog form which is applied through line 28 to the servo drive circuit 11 with a polarity such as to cause movement of the element 13 in the proper direction. If, for example, the cumulative sum of the up command pulses on line 25 and the down resolver pulses on line 22 exceeds the cumulative sum of the down command pulse on line 26 and up resolver pulses on line 21, an analog error signal of one polarity is produced such as to cause movement of the element 13 in the "up" direction so as to increase the number of up resolver pulses and to move the system toward a balanced condition.

The resolver digitizer circuit 18 operates in a very smooth and highly accurate manner to respond to the 2500 Hz resolver output signal and to generate pulses at a frequency of up to 1 MHz. In brief, a reference signal is generated for comparison with a signal derived from the resolver output and a periodic sampling operation is performed in which the phase difference between such signals is measured. One important feature is that during the time interval between completion of each sampling operation and completion of the next, a train of output pulses is smoothly developed at a substantially uniform rate or frequency which corresponds to the measured phase difference.

Another feature relates to the feedback of such pulses to a correction counter in a manner such as to shift the phase of the reference signal in proportion to the previously measured phase shift. The phase of the reference signal is continually up-dated so that the sampling circuitry measures the phase shift which has occurred since the previous sampling operation. Moreover, the arrangement is such that a balance is obtained only when the cumulative number of output pulses which are fed back to the correction counter accurately corresponds to the cumulative phase shift of the resolver output. As a result, a very high degree of positional accuracy is achieved.

Basic portions of the resolver digitizer circuit 18 are illustrated in FIG. 2. A shaping circuit 28 is operative to convert a 2500 Hz complex AC output from the resolver, received on line 17, into a square wave which is applied to a divide-by-two flip-flop to develop a 1250 Hz square wave feedback signal which is applied through a line 29 to a pulse train generator 30. A reference signal generator 32 is also provided which, among other things, develops a 1250 Hz square wave reference signal applied through a line 33 to the pulse train generator 30.

The pulse train generator 30 compares the phase of the 1250 Hz square wave feedback and reference signals on lines 29 and 33 and develops a corresponding train of pulses on one or the other of the lines 21 or 22, depending upon which of the two square wave signals is in phase leading relationship to the other. Each train of pulses is developed at a rate proportional to the phase difference between the feedback and reference signals applied on lines 29 and 33 during a preceding sampling time interval.

The reference signal circuit 32 includes clock circuitry from which a pair of out of phase 10 MHz clock signals and a 1.25 MHz clock signal are applied through lines 34, 35 and 36 to the pulse train generator 30. In addition, a counter circuit is provided which develops from 10 MHz clock signals a pair of 2500 Hz square wave signals in 90° phase relationship, applied through the lines 19 and 20 to the resolver exitation circuit 15.

In addition, the reference signal circuit 32 includes a phase correction circuit which shifts the phase of the reference signal on line 33 in response to pulse and sign signals applied through lines 37 and 38 from the pulse train generator 30. Output pulses from the pulse train generator 30 are fed back through line 37 for shifting the phase in a direction controlled by a signal on line 38, the direction of shift being such as to cause the phase of the reference signal on line 33 to follow changes in the phase of the feedback signal on line 29. As a result, the reference signal on line 33 is continually up-dated so that each sampling operation measures the phase shift which has occurred since the previous sampling operation.

FIG. 2 also illustrates basic portions of the pulse comparator and error signal generator circuit 24 which includes a latch and multiplexer circuit 40 operative to develop output error pulses in time-displaced relation while allowing application of input pulses at random times, avoiding problems which might otherwise result from coincidences and overlap of pulses and allowing greater speed of operation. The circuit 40 has inputs connected to the lines 21, 22, 25 and 26 to receive up and down count pulses from the resolver digitizer circuit 18 and up and down command pulses applied to lines 25 and 26. The circuit 40 stores received pulses in latch circuits which are scanned through a multiplexer circuit to produce up and down output pulses on lines 41 and 42. The multiplexer circuit is controlled from a clock signal applied through a line 43 from the reference signal generator circuit 32.

The up and down count pulses developed on lines 41 and 42 are applied through a steering or direction control circuit 44 and through lines 45 and 46 to an error accumulator circuit 48. Circuit 48 stores any cumulative error in digital form. Its storage capability allows storage of a relatively large error such as may be developed because of response speed limitations of a servo drive system with which the system 10 is used. The storage capability may be readily expanded if necessary.

The error accumulator circuit 48 includes a reversible counter which is so operated as to digitally store any cumulative error in either direction up to the limits of its storage capacity. In one condition of the direction control circuit 44, down resolver and up command pulses will be applied from lines 22 and 25 and through the circuit 40 and the direction control circuit 44 and line 45 to the reversible counter in circuit 48 to cause an increase in the count, whereas up resolver and down command pulses will be applied through the circuits and through lines 42 and 46 to reduce the count. When the count in the counter in circuit 48 is reduced to zero and a down pulse is applied, a borrow signal is detected by a sign memory circuit 50 which applies signals through lines 51 and 52 to produce a second condition of the circuit 44 and to reverse the direction. Thus, for example, down command pulses which might previously have been applied to reduce the count in the counter will be applied to increase the count in the counter. If in the second condition, the count is again reduced to zero and a down pulse is applied, a borrow signal is detected to reverse the condition back to the first condition.

The error accumulator circuit 48 is coupled to a digital-to-analog convertor circuit 54 which develops an analog voltage proportional to the error count stored in the accumulator 48, such being applied through a line 55 and through a polarity switching circuit 56 to the output line 28 connected to the input of the servo drive circuit 11. Polarity switching circuit 56 is controlled through lines 51 and 52 from the sign memory circuit 50 to control the polarity of the analog output signal in accordance with the direction in which the circuit 48 is counting.

Figure 3:
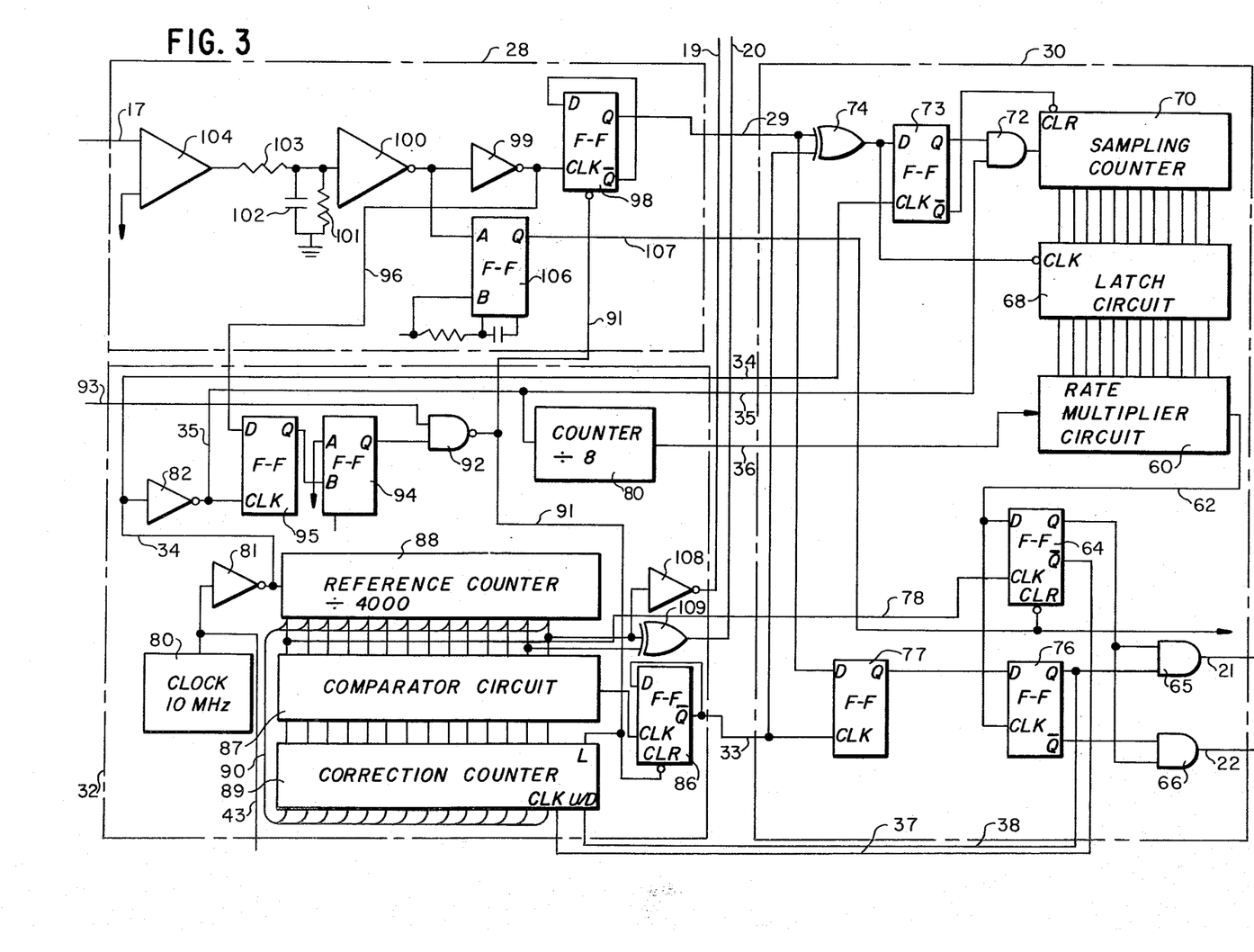
FIG. 3 is a schematic block and circuit diagram showing details of shaping circuit, a reference signal circuit and a pulse train generator circuit of the resolver digitizer circuit.

FIG. 3 shows the circuitry of the resolver digitizer circuit 18 in more detail. An important feature relates to the provision of a binary rate multiplier 60 which generates pulses at a substantially uniform rate and contributes to a very smooth and accurate operation of the system. The binary rate multiplier 60 receives input pulses at a 1.25 MHz rate from reference signal circuit 32 through the line 36 and develops output pulses on an output line 62, such output pulses being applied through a flip-flop 64, operative as a synchronizer, to inputs of a pair of AND gates 65 and 66, the outputs of gates 65 and 66 being connected to the lines 21 and 22 on which the up and down resolver pulses are developed.

The binary rate multiplier 60 has twelve control inputs connected to a latch circuit 68 and, depending upon the signals applied to such control inputs, different fractions of the number of applied clock pulses are developed on the output line 62 in a given time interval. For example, a signal on first input may control transmission of one clock pulse at a certain time after clearing of the circuit and prior to the application of 4096 clock pulses to the input line 36. A signal on a second input may similarly control transmission of 5 clock pulses at certain times, and signals on third through twelve inputs may respectively control transmission of 4, 8, 16, 64, 128, 512, 1024 and 2048 pulses. The pulses developed from a signal on each input are developed at uniform rates equal to a submultiple of the input frequency and when pulses from a plurality of inputs are combined, the result is a pulse train which may have a slight variation in rate during generation thereof, but will be at a substantially uniform rate during any time interval of substantial duration.

The latch circuit 68 develops the rate control signal in accordance with the phase shift between the feedback and reference signals on lines 29 and 33 with the information in the latch circuit 68 being continually updated.

In particular, the latch circuit 68 has twelve inputs connected to outputs of a sampling counter 70 and having an input connected to the output of a gate 72 operative as a burst modulator in applying a burst of high frequency pulses proportional in number to the phase difference between feedback and reference signals on lines 29 and 33. The gate 72 is an AND gate and one input is connected to the line 35 to receive 10 MHz clock signals from the reference signal circuit 32. The second input of the gate 72 is connected to the Q output of a D-type flip-flop 73 which is operative as a synchronizer and which has a D input connected to the output of an Exclusive-OR gate 74, the inputs of gate 74 being connected to the lines 29 and 33.

The gate 74 operates as a phase detector, developing pulses having widths or durations proportional to the phase difference between the square wave feedback and reference signals developed on lines 29 and 33. Such pulses are applied through the synchronizing flip-flop 73 to the burst modulator gate 72 to control the transmission of the 10 MHz clock pulses from line 35 to the sampling counter 70.

To obtain the proper sequence of operation, a clock input of the flip-flop 73 is connected to the line 34 to receive from the reference signal circuit 32 a 10 MHz clock signal in 180° phase relation to the signal on line 35. The output of the phase detector gate 74 is applied to a clock signal input of the latch circuit 68 and the $\overline{Q}$ output of the flip-flop 73 is connected to a clear signal input of the sampling counter 70.

In operation, a pulse from the phase detector gate 74, applied to the D input of the flip-flop 73, so conditions the flip-flop 73 that it is triggered by the next leading edge of a 10 MHz clock signal applied on line 34. The burst modulator gate 72 is then enabled from the signal applied at the Q output of the gate 73 to allow transmission of clock pulses from the line 35 to the sampling counter 70 until the flip-flop is reset by the first clock pulse after the termination of the pulse developed by the phase detector gate 74, the counter 70 being cleared where the flip-flop 73 is reset. At such termination and prior to clearing of the counter 70, the latch circuit 68 is clocked to enter the count of the counter 70 therein. The binary rate multiplier 60 then operates to transmit pulses at a rate determined by the information in the latch circuit 68.

The pulse train generator 30 further includes circuitry to control transmission of the generated pulse trains on the proper one of the output lines 21 and 22 and also to develop a sign signal on the line 38 to control the direction of application of correction pulses applied through the line 37. The gates 65 and 66 have inputs connected to a Q output of a D-type flip-flop 76 having a D input connected to the Q output of another D-type flip-flop 77, the D and clock inputs of the flip-flop 77 being respectively connected to the feedback and reference signal lines 29 and 33. The flip-flop 77 is switched according to the sign of the phase difference between the signals on lines 29 and 33 and, through the flip-flop 76, controls the gates 65 and 66. The clock input of the flip-flop 76 is connected to the output of the rate multiplier circuit 60 and flip-flop 76 performs a synchronizing function to prevent missing of a sign change which occurs substantially in phase with a pulse.

It is noted that the flip-flop 64 also performs a delay function, operating to delay development to an output pulse to insure that the sign has been properly determined by flip-flop 76 before the output pulse is transmitted. The flip-flop 64 is a D-type flip-flop, the Q output thereof being connected to gates 65 and 66, the $\overline{Q}$ output thereof being connected to the line 37 and the D input being connected to the line 62 at the output of the multiplier circuit 60. A clock input of the flip-flop 64 is connected through a line 78 to the reference signal circuit 32 to receive a 5 MHz signal synchronized with the 10 MHz clock signals.

The reference signal circuit 32 includes a 10 MHz oscillator 80 which forms the master clock of the system. The output of the oscillator 80 is connected to the line 43 to transmit 10 MHz clock signals to the latch and multiplexer circuit 40 of the pulse comparator and error signal generator circuit 24. The output of the oscillator 80 is also connected through an inverter 81 to the line 34 which, in turn, is connected through an inverter 82 to the line 35, the clock signals on lines 34 and 35 being thus in 180° phase relation. The output of inverter 82 is also connected to the input of a divide-by-8 circuit 80 to develop the 1.25 MHz clock signals on line 36 for application to the rate multiplier circuit 60.

The 1250 Hz reference signal on line 33 is developed at the Q output of a D-type flip-flop 86 which is operable as a divide-by-2 circuit with the D input thereof being connected to the Q output thereof. The clock input of the flip-flop 86 is connected to the output of a comparator 87 which compares the output of a fixed phase reference counter 88 with the output of a phase correction counter 89.

The reference counter 88 is a divide-by-4000 counter which operates at a 2500 Hz rate in response to 10 MHz signals applied from the output of the gate 81. The correction counter 89 is a reversible counter and stores at any given time a certain number which may be increased or decreased by pulses applied on line 37 from the Q of the flip-flop 64, according to the sign information on the line 38.

The comparator circuit 87 develops an output pulse when the counts in counters 88 and 89 are equal and thus develops a signal which has a nominal frequency of 2500 Hz and which is phase-modulated or frequency-modulated in accordance with the correction signals applied through lines 37 and 38.

If, for example, the feedback signal on line 29 should lead the reference signal developed on line 33, a sign signal will be fed on line 38 to cause the pulses fed on line 37 to change the count in the correction counter 89 in a direction such as to produce a leading phase shift in the reference signal developed on line 33. Thus, phase shifts in the reference signal on line 33 follow phase shifts in the resolver feedback signal on line 29. The result is that when the phase of each signal is considered with respect to cumulative changes from an initial reference, the phase of the reference signal on line 33 for measurement of phase shift at each phase sampling time is equal to or approaches equality with the phase of the feedback signal on line 29 which existed at the previous sampling time.

At times, as during periods of high acceleration or deceleration, there may be a small error due to the fact each sampling time has a finite duration. However, any such errors are not cumulative and are ultimately self-correcting with there being no error in the final positioning of an element. A balance is obtained only when the cumulative number of output pulses fed back to the correction counter 89 accurately corresponds to the cumulative phase shift of the resolver output.

To obtain proper operation, it is important that the reference signal on line 33 be in step with the resolver signal on line 29 under certain reference conditions. For this reason, an automatic zero circuit is provided which operates to load the number which is in the reference counter 88 into the correction counter 89 at the time a sinusoidal resolver feedback signal crosses zero in the negative-going direction.

As diagrammatically illustrated by a line 90, the outputs of the reference counter 88 are connected to inputs of the counter 89 and upon application of a load signal to a line 91, the count in the counter 88 may be transferred to the counter 89. The line 91 is connected to the output of a NAND gate 92, one input of which is connected to a line 93 to which an automatic zero signal may be applied at any desired time, as from a reset circuit of a master control.

The second input of the gate 92 is connected to a Q output of a flip-flop 94 which is so connected as to operate as a one-shot or monostable multivibrator, developing an output pulse of short duration, substantially less than the duration of one clock cycle. The input of the flip-flop 94 is connected to the Q output of a D-type flip-flop 95, the clock input of which is connected to the output of inverter 82 to receive 10 MHz clock signals therefrom. The D input of the flip-flop 95 is connected through a line 96 to a circuit point in the shaping circuit 28 which goes positive during negative half cycles of the sinusoidal resolver feedback signal.

In operation, the first clock pulse after the start of the negative half cycle of the sinusoidal resolver signal will result in triggering of the flip-flop 94 to apply a pulse through the gate 92 and the line 91 to the load input of the correction counter 89 to transfer the count then in the reference counter 88 to the correction counter 89.

The signal developed at the output of the gate 92 is also applied to a clear input of the flip-flop 86 and to a clear input of a flip-flop 98 in the shaping circuit 28 to clear both and to obtain the proper phase relationship of the square wave signals on lines 29 and 33.

The shaping circuit 28 includes the flip-flop 98 which is a D-type flip-flop connected in the same way as the flip-flop 86 to operate as a divide-by-2 circuit. The clock input thereof and also the line 96 are connected to the output of an inverter 99, the input of which is connected to the output of a line receiver 100. The input of the line receiver 100 is connected to ground through a resistor 101 and a capacitor 102 in parallel and is also connected through a resistor 103 to the output of an amplifier 104, the input of which is connected to the line 17 to receive the complex AC signal from the rotor of the resolver 14. The circuits operate to clip and shape the signals to produce a square wave output which retains phase information and which is between the desired levels for application through line 96 to the D input of flip-flop 95 and for application to the clock input of flip-flop 98.

A loss of feedback detector may be included within the shaping circuit 28, including a flip-flop 106 connected as shown and having a Q output connected through a line 107 to the clear input of the flip-flop 64.

Line 107 may also be connected to display and other circuitry.

It is also noted that the first stage of the reference counter 88 is the source of the 5 MHz signal applied through lines 78 to the flip-flop 64 and that the last two stages provide signals for developing 2500 Hz square wave signals in quadrature phase relation for application to the resolver excitation circuit. The last stage is connected through an inverter 108 to the line 19 and the last two stages are connected to inputs of an Exclusive - OR gate 109 the output of which is connected to line 20.

Figure 4:
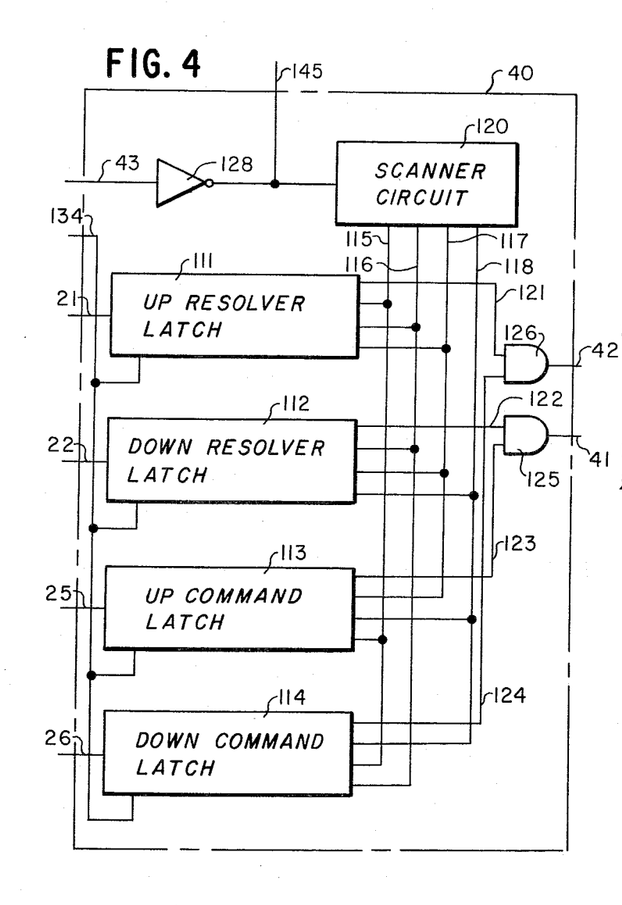
FIG. 4 is a schematic circuit diagram showing details of a latch and multiplexer circuit of the pulse comparator and error circuit.

FIG. 4 shows details of the latch and mutiplexer circuit 40 which operates to develop error pulses on output line 41 in response to up command pulses on line 25 and down resolver pulses on input line 22 and to develop error pulses on output line 42 in response to down command pulses on input line 26 and up resolver pulses on input line 21. Such output error pulses are developed in time-displaced relation, avoiding any problems which might otherwise arise from coincidence or overlap between applied input pulses. The circuit allows for greater speed of operation as well as asynchronous operation.

The input pulses from lines 21, 22, 25 and 26 are stored in latch circuits 111–114, respectively identified as up resolver, down resolver, up command and down command latch circuits. The latch circuits 111–114 are operated and outputs thereof are scanned through signals applied from four output lines 115–118 of a scanner circuit 120, output pulses being developed on four latch circuit output lines 121–124. Output pulses on lines 122 and 123, from the down resolver and up command latch circuits 112 and 113, are applied through a gate 125 to the line 41. Output pulses on lines 121 and 124, from the up resolver and down command latches 111 and 114, are applied through a gate 126 to the output line 42. The gates 125 and 126 are arranged to perform OR functions.

Clock signals at the 10 MHz rate are applied from line 43 and through an inverter 128 to the input of the scanner 120 which operates at a frequency of 2.5 MHz, developing four phase displaced output pulses on lines 115–118 during each clock cycle, each pulse having a duration of 0.050 microseconds with a 0.050 microsecond interval between the end of each pulse and the beginning of the next pulse on the succeeding phase.

In effecting operation of the latch 111, a first pulse applied on line 115 effects storage in a flip-flop of the latch of any applied up resolver pulse received since the last pulse applied on line 115. A second pulse applied on line 116 effects gating of a stored pulse to the output line 121 and a third pulse resets the storage flip-flop. The latch 112 is operated in a similar fashion by sequential pulses on lines 116, 117 and 118; the latch 113 is operated by sequential pulses on lines 117, 118 and 115 and the latch 114 is operated by sequential pulses on lines 118, 115 and 116.

Figure 5:
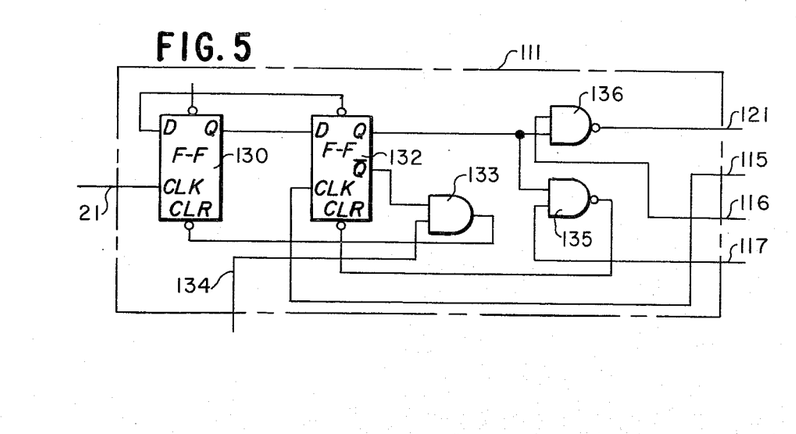
FIG. 5 is a schematic circuit diagram showing details of one of four latch circuits of the circuit shown in FIG. 4.

FIG. 5 shows the circuitry of the up resolver latch circuit 111, the circuits of the other latch circuits 112–114 being the same. An input D-type flip-flop 130 is triggered by an input signal applied through line 21 to its clock input, the D input thereof being connected to a power input terminal thereof. When flip-flop 130 is triggered, an enable signal is applied from its Q output to the D input of another D-type flip-flop 132 which is then conditioned to be triggered in response to the next pulse applied from line 115 to its clock input. When flip-flop 132 is triggered, a signal is applied from the $\overline{Q}$ thereof and through an AND gate 133 to a clear input of the flip-flop 130, conditioning flip-flop 130 for reception of another input pulse. Flip-flop 130 may also be reset by a master reset signal applied to a second input of gate 133 from a reset line 134.

When a pulse is applied from the second phase line 116, a signal is applied to the output line 121 if the flip-flop 132 is in a set condition, the line 116 and the Q output of the flip-flop 132 being connected to the inputs of a gate 136, the output of which is connected to the line 121.

When a pulse is supplied from the third phase line 117, the flip-flop 132 will be placed in a reset condition, if not already in such a condition, the line 117 and the Q output of flip-flop 132 being connected to the input of a gate 135 having an output connected to the clear input of flip-flop 132.

Figure 6:
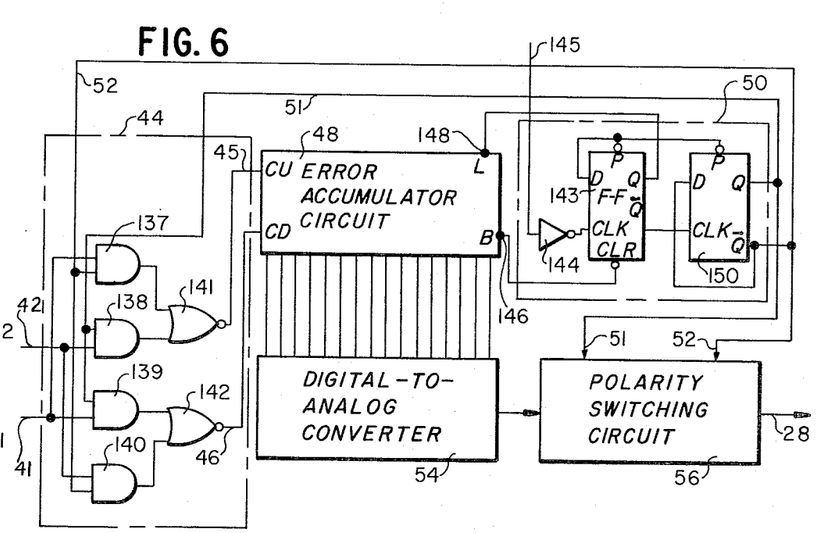
FIG. 6 is a schematic circuit diagram showing details of a direction control circuit and a sign memory circuit and their corrections to error accumulator, converter and polarity switching circuits.

FIG. 6 shows details of the direction control circuit 44 and the sign memory and control circuit 50. Such circuits are provided, along with the polarity switching logic circuit 56, because reversible counter circuits in the error accumulator circuit 48 will not digitally store a negative number. There are two conditions of operation. In the first condition, up command and down resolver pulses are applied to a count up input of the error accumulator circuit 48 while down command and up resolver pulses are applied to the count down input of the error accumulator circuit 48. In this first condition, the positive analog error signal at the output of the digital-analog converter 54 is applied through the polarity switching logic 56 to the output line 28 without any polarity reversal, to apply a positive analog error signal through line 28 to the servo drive 11.

The first condition of operation is maintained as long as the combined total of the up command and down resolver pulses is not greater than the combined total of the down command and up resolver pulses. The circuits are switched to a second condition of operation when the combined total of the down command and up resolver pulses is greater than the combined total of the up command and down resolver pulses. A borrow pulse is then generated by the error accumulator 48 and the sign memory and control circuit 50 then applies signals through lines 51 and 52 to the direction control circuit 44 and to the polarity switching logic circuit 56 to obtain a second condition of operation.

In the second condition of operation, up command and down resolver pulses are applied from line 41 and through the circuit 44 to line 46 to be applied to the count down input of the error accumulator circuit 48 while down command and up resolver pulses are applied from line 42 and through the circuit 44 to the line 45 to be applied to the count up input of the error accumulator circuit 48.

Also, during the second condition of operation, the positive analog signal at the output of the digital-analog converter 54 is reversed in polarity through the polarity switching logic circuit 56 and a negative analog error signal is developed on output line 28 for application to the servo drive 11.

The direction control circuit 44 includes four gates 137–140, the gates 137 and 139 having inputs connected to line 42 and the gates 138 and 140 having inputs connected to line 42. The control line 51 is connected to inputs of gates 138 and 139 while the control line 52 is connected to inputs of gates 137 and 140, gates 138 and 139 being enabled in one condition of operation while gates 137 and 140 are enabled in the other condition of operation. The outputs of gates 137 and 138 applied through a gate 141 to the line 45 while the outputs of gates 139 and 140 are applied through a gate 142 to the line 46, lines 45 and 46 being connected to the count up and count down inputs of the error accumulator circuit 48.

In the sign memory and control circuit 50, a first flip-flop 143 is provided having a clock input connected to the output of an inverter 144, the input of inverter 144 being connected through a line 145 to the output of the inverter 128 in the latch and multiplexer circuit 40. Clock pulses at the 10 MHz rate are thus applied to the clock input of flip-flop 143 and it is triggered to a set condition in response to each such clock pulse, the D input of flip-flop 143 being connected to the power or supply voltage input thereof.

The error accumulator circuit 48 has a borrow output terminal 146 and when a borrow pulse is generated thereat, it is applied to a clear input of the flip-flop 143, resetting the flip-flop 143. A load signal is applied from the Q output thereof to a load input terminal 148 of the error accumulator 48 so that in response to input pulses after removal of the load signal, the error accumulator will count such pulses in the normal manner increasing the count in response to pulses applied on line 45 and decreasing the count in response to pulses applied on line 46.

The $\overline{Q}$ output of the flip-flop 143 is connected to the clock input of a second flip-flop 150, the D input of which is connected to the $\overline{Q}$ output thereof. In response to each operation of the flip-flop 143, the flip-flop 150 is switched from one condition to the other and it thus operates as a sign memory flip-flop. The Q and $\overline{Q}$ outputs of the flip-flop 150 are respectively connected to the lines 51 and 52 to control the direction control circuit 44 and to control the polarity switching logic circuit 56.

The details of the polarity switching logic circuit 56 are not shown, it being understood that any circuit may be provided for transmitting an analog error signal of positive polarity in response to one control signal and for transmitting a positive analog error signal with a reversed polarity in response to a second control signal. Various other circuits and components are not illustrated in detail because known types of circuits may be used as will be appreciated by those skilled in the art.

It will be understood that modifications and variations may be effected without departing from the spirit and scope of the novel concept of this invention.

What is claimed is:

1. In a digital control system for controlling movement of an element with respect to a reference position, feedback signal means for generating feedback signals in response to movement of said element with respect to said reference position with each feedback signal having a phase shift corresponding in direction and magnitude of the movement of the element since the next previous feedback signal, and pulse train generating means for operating in response to said feedback signals to generate output signals which indicate both the direction and magnitude of said phase shifts and which include sequential trains of pulses with the number of pulses in each train corresponding to the magnitude of the corrsponding phase shift.

2. In a system as defined in claim 1, reference signal means for supplying clock pulses, said pulse train generating means comprising gating means coupled to said reference signal means and responsive to each of said feedback signals for transmitting a number of clock pulses proportional to the movement represented by said feedback signal with said clock pulses being transmitted at a generally uniform rate during each interval of time between each feedback signal and the next succeeding feedback signal.

3. In a system as defined by claim 2, said gating means comprising a rate multiplier circuit having a plurality of control inputs respectively operable to control transmission of different fractions of the number of applied clock pulses in a given time interval, and rate control means for applying signals to said control inputs in accordance with movements represented by said feedback signals.

4. In a system as defined in claim 1, said feedback signal means comprising resolver means including means arranged to be mechanically coupled to said element and including means for developing said feedback signals with each feedback signal being shifted in phase in proportion to movement of the element since the next previous feedback signal.

5. In a system as defined in claim 1, reference signal means for supplying clock pulses, said pulse generating means comprising means for developing gating control signals having durations proportional to the phase shifts of said feedback signals, and gating means coupled to said reference signal means and responsive to each of said gating control signals to transmit said clock pulses.

6. In a system as defined in claim 5, said pulse generating means further comprising counter means for counting the number of clock pulses transmitted by said gating means in response to each gating control signal.

7. In a system as defined in claim 6, said pulse generating means further comprising latch circuit means for temporary storage of a count registered by said counter means, addditional gating means including a rate multiplier circuit responsive to input pulses and having a plurality of control inputs respectively operable to control transmission of different fractions of the number of applied input pulses in a given time interval, and means for applying rate control signals from said latch circuit means to said control inputs of said rate multiplier circuit, said reference signal means being operative to supply clock pulses to form input pulses for said rate mutiplier circuit.

8. In a system as defined in claim 1, said pulse train generating means comprising reference signal means for generating a reference signal at a frequency equal to that of said feedback signals and having a predetermined phase relation to said feedback signals when said element is at a certain reference position, and means operative to respond to the phase shifts of said feedback signals relative to said reference signals to generate said output signals which indicate the direction and magnitude of said phase shifts.

9. In a system as defined in claim 8, said reference signal means comprising correction means responsive to said output signals for changing the phase of said reference signal in a direction corresponding to the direction of the corresponding feedback signal phase shift and with a magnitude in proportion to the number of pulses in said train of pulses thereof.

10. In a system as defined in claim 9, said reference signal means comprising a clock pulse source and counter means coupled to said clock pulse source and to said pulse train generating means to generate a reference signal shifted in phase in accordance with the cumulative number of pulses in said sequential trains of pulses.

11. In a system as defined in claim 10, an automatic zero circuit for operating said counter means to fix the phase of said reference signal at a certain value when the element is at a certain position.

12. In a system as defined in claim 10, said counter means comprising a first counter responsive to clock pulses from said clock pulse source, a second counter responsive to said sequential trains of pulses, and a comparator circuit for comparing counts in said first and second counters to generate said reference signal.

13. In a system as defined in claim 12, an automatic zero circuit including means for establishing equal counts in both said first and second counters.

14. In a system as defined in claim 1, comparator and error signal means for responding to command pulses and to said output signals to generate an analog error signal having an amplitude corresponding to the number of pulses in said sequential trains of pulses and having a polarity corresponding to the direction of the corresponding feedback signal pulse shift.

15. In a system as defined in claim 14, said comparator and error signal means comprising counter means for developing an error signal in digital form, and digital-to-analog converter means coupled to said counter means for generating said analog error signal.

16. In a system as defined in claim 15, said counter means including a reversible counter, and signal memory and direction control means for controlling the direction of application of command and feedback pulses to said counter for permitting said counter to store any cumulative error in either direction.

17. In a system as defined in claim 16, polarity control means controlled by said sign memory and direction control means for controlling the polarity of said analog error signal.

18. In a control system as defined in claim 1, for responding to command signals in the form of pulses each of which corresponds to a certain incremental distance of movement and for responding to a low frequency signal from a resolver shifted in phase in proportion to movement of the element, said feedback signal means being arranged to develop said feedback signals from phase shifts in said low frequency signal, said pulse train generating means being operative to generate a train of feedback pulses in response to the phase shift represented by each feedback signal with each feedback pulse corresponding to said certain incremental distance of movement to which each command pulse corresponds, and comparator and error signal means for responding to said command pulses and said feedback pulses to generate an analog error signal.

19. In a control system as defined in claim 18, said comparator and error signal means comprising counter means for storing as a digital number any cumulative difference between command and feedback pulses, and counter means for converting said digital number to an analog error signal.

20. In a control system as defined in claim 19, said pulse train generator means being arranged to develop said feedback pulses at a substantially uniform rate during each time interval between response to the phase shift represented by each feedback signal and response to the phase shift represented by the next subsequent feedback signal.

* * * * *